United States Patent
Kikuchi et al.

(10) Patent No.: US 11,253,903 B2
(45) Date of Patent: Feb. 22, 2022

(54) CENTERING METHOD OF ROTARY CAULKING DEVICE, ROTARY CAULKING DEVICE MANUFACTURING METHOD, HUB UNIT BEARING MANUFACTURING METHOD, VEHICLE MANUFACTURING METHOD, CENTERING DEVICE OF ROTARY CAULKING DEVICE, AND ROTARY CAULKING SYSTEM

(71) Applicant: NSK LTD., Tokyo (JP)

(72) Inventors: Tokumasa Kikuchi, Fujisawa (JP); Nobuyuki Hagiwara, Fujisawa (JP); Tetsurou Maruno, Fujisawa (JP)

(73) Assignee: NSK LTD., Tokyo (JP)

( * ) Notice: Subject to any disclaimer, the term of this patent is extended or adjusted under 35 U.S.C. 154(b) by 176 days.

(21) Appl. No.: 16/647,701

(22) PCT Filed: Oct. 24, 2018

(86) PCT No.: PCT/JP2018/039462
§ 371 (c)(1),
(2) Date: Mar. 16, 2020

(87) PCT Pub. No.: WO2019/107021
PCT Pub. Date: Jun. 6, 2019

(65) Prior Publication Data
US 2020/0276630 A1     Sep. 3, 2020

(30) Foreign Application Priority Data
Nov. 30, 2017   (JP) .............................. JP2017-229787

(51) Int. Cl.
*B21D 39/04*     (2006.01)
*G01B 11/27*     (2006.01)

(52) U.S. Cl.
CPC ............ *B21D 39/04* (2013.01); *G01B 11/272* (2013.01)

(58) Field of Classification Search
CPC ...... B21D 39/04; B21D 39/00; G01B 11/272; B21K 1/04; B21K 1/40; B21K 25/00; B21J 9/025
See application file for complete search history.

(56) References Cited

U.S. PATENT DOCUMENTS

| 4,566,202 A | 1/1986 | Hamar |
| 5,615,569 A | 4/1997 | Schlatter |

(Continued)

FOREIGN PATENT DOCUMENTS

| DE | 3202254 A1 | 7/1983 |
| EP | 0383578 A2 | 8/1990 |

(Continued)

OTHER PUBLICATIONS

International Search Report for PCT/JP2018/039462 dated Jan. 29, 2019 [PCT/ISA/210].

(Continued)

*Primary Examiner* — Lee A Holly
(74) *Attorney, Agent, or Firm* — Sughrue Mion, PLLC

(57) ABSTRACT

In a preparation step, a frame (10), a concave spherical seat (15), a convex spherical seat (13), a rotation body (16), a rotating shaft (12), and a work holder (17) are assembled, a laser head (33) is attached to the convex spherical seat (13), and a light receiving unit (38) is attached to the work holder (17). In a rotation body centering step, an irradiation position of a laser beam (LB) with respect to a laser irradiation surface (41) is changed by rotating the rotation body (16) while allowing the laser irradiation surface (41) to be (Continued)

irradiated with the laser beam (LB) emitted from the laser head (33) and a trajectory of the irradiation position is checked.

14 Claims, 10 Drawing Sheets

(56) References Cited

U.S. PATENT DOCUMENTS

| | | |
|---|---|---|
| 2016/0209825 A1 | 7/2016 | Murakawa |
| 2016/0263940 A1* | 9/2016 | Hagiwara ............... B60B 27/00 |

FOREIGN PATENT DOCUMENTS

| | | | |
|---|---|---|---|
| GB | 2113589 | A | 8/1983 |
| JP | 2-197345 | A | 8/1990 |
| JP | 5-066819 | A | 3/1993 |
| JP | 6-312295 | A | 11/1994 |
| JP | 2013-091067 | A | 5/2013 |
| JP | 2015-077616 | A | 4/2015 |
| JP | 2016-134036 | A | 7/2016 |
| WO | 2004/001247 | A1 | 12/2003 |

OTHER PUBLICATIONS

Extended European Search Report dated Jun. 17, 2020, from the European Patent Office in Application No. 18880051.0.

* cited by examiner

210

CENTERING METHOD OF ROTARY CAULKING DEVICE, ROTARY CAULKING DEVICE MANUFACTURING METHOD, HUB UNIT BEARING MANUFACTURING METHOD, VEHICLE MANUFACTURING METHOD, CENTERING DEVICE OF ROTARY CAULKING DEVICE, AND ROTARY CAULKING SYSTEM

CROSS REFERENCE TO RELATED APPLICATIONS

This application is a National Stage of International Application No. National Stage of PCT/JP2018/039462 filed Oct. 24, 2018, claiming priority based on Japanese Patent Application No. 2017-229787 filed Nov. 30, 2017.

The present invention relates to a centering method of a rotary caulking device or the like for forming a caulking portion by plastically deforming, for example, a tubular portion provided at an axial end portion of a shaft member outward in the radial direction.

Priority is claimed on Japanese Patent Application No. 2017-229787, filed Nov. 30, 2017, the contents of which are incorporated herein by reference.

BACKGROUND ART

A hub unit bearing is used to rotatably support a vehicle wheel of an automobile by a suspension device. In general, the hub unit bearing is used while a preload is applied thereto. Conventionally, as a method of caulking an axial end portion of a hub wheel, rotary caulking for pressing a rotary caulking die against an axial end of a hub wheel is widely known. As a rotary caulking device for performing such rotary caulking, one including a shaft attachment spherical seat precession moving along with a molding die is known (for example, see Patent Document 1). In this shaft attachment spherical seat, one side portion of a rotary shaft in the axial direction is fixed to the convex spherical seat having the molding die attached thereto. The convex spherical seat spherically engages with a concave spherical seat fixed to a frame. By this spherical engagement, the shaft attachment spherical seat is allowed to precess about a reference axis of the frame. Further, it is possible to efficiently support a machining reaction force applied to the molding die by the concave spherical seat. The rotary shaft is disposed to be inclined with respect to the reference axis of the frame and is rotatably supported at one circumferential position on the rotation body of which the other side portion in the axial direction is rotatably supported by the frame. By the rotation of the rotation body, the shaft attachment spherical seat is allowed to precess about the reference axis of the frame.

When performing caulking by using such a rotary caulking device, the shaft attachment spherical seat and the molding body are allowed to precess about the reference axis of the frame by the rotation of the rotation body while the molding die is pressed against a cylindrical portion 8 of a hub wheel 6 held coaxially with the reference axis of the frame. Accordingly, the cylindrical portion 8 is plastically deformed outward in the radial direction so that a caulking portion 9 is formed.

CITATION LIST

Patent Literature

[Patent Document 1]
Japanese Patent Application, Publication No. 2013-91067

SUMMARY OF INVENTION

Technical Problem

In the above-described rotary caulking device, when the coaxiality between the concave spherical seat and the rotation body is poor, the center axis of the precession motion of the molding die is inclined so that the processing accuracy of the caulking portion becomes poor. As a result, since a force in which the caulking portion holds the axial inner end surface of the inner race becomes uneven in the circumferential direction, there is a possibility that a preload of a rolling element will also become uneven in the circumferential direction.

An object of the present invention is to provide means capable of obtaining satisfactory coaxiality between a concave spherical seat and a rotation body.

Solution to Problem

An aspect of a rotary caulking device of the present invention includes a frame, a concave spherical seat, a convex spherical seat, a rotation body, a rotating shaft, a molding die, and a work holder. The frame has a reference axis. The concave spherical seat is formed in an annular shape, is fixed to the frame, and includes a concave spherical portion formed on one side surface in a direction of the reference axis to be coaxial with the reference axis. The convex spherical seat includes a convex spherical portion which spherically engages with the concave spherical portion. The rotation body is supported by the frame to be rotatable about a center axis coaxial with the reference axis. The rotating shaft is inserted through the concave spherical seat while being inclined with respect to the reference axis and is provided so that one side portion in the direction of the reference axis is fixed to the convex spherical seat and the other side portion in the direction of the reference axis is rotatably supported at one circumferential position of the rotation body. The molding die is attached to the convex spherical seat. The work holder is used to hold a workpiece, is disposed at the side opposite to the rotation body with the molding die interposed therebetween in the direction of the reference axis, and is movable relative to the frame in the direction of the reference axis.

An aspect of a centering method of a rotary caulking device of the present invention includes a preparation step and a rotation body centering step. In the preparation step, the frame, the concave spherical seat, the convex spherical seat, the rotation body, the rotating shaft, and the work holder are assembled, a laser head emitting a laser beam onto the center axis of the rotating shaft is attached to the convex spherical seat, and a light receiving unit including a planar laser irradiation surface orthogonal to the reference axis is attached to the work holder. In the rotation body centering step, an operation of changing a laser beam irradiation position with respect to the laser irradiation surface by rotating the rotation body while allowing the laser irradiation surface to be irradiated with a laser beam emitted from the laser head and checking a trajectory of the irradiation position is performed until the trajectory of the irradiation position changes to a predetermined shape while adjusting a rotation body support position with respect to the frame within a virtual plane orthogonal to the reference axis after the preparation step ends.

The centering method of the rotary caulking device of the present invention can adopt the following configuration. That is, the rotary caulking device is able to coaxially dispose the rotating shaft and the molding die by engaging a molding die side engagement portion provided in the molding die with a convex spherical seat side engagement portion provided in the convex spherical seat at the time of attaching the molding die to the convex spherical seat. In the preparation step, the laser head is attached to the convex spherical seat in a state in which the laser beam emitted from the laser head is able to be emitted onto the center axis of the rotating shaft by engaging a head side engagement portion provided in the laser head with the convex spherical seat side engagement portion.

The centering method of the rotary caulking device of the present invention can adopt the following configuration. That is, the rotary caulking device includes an adapter attached to the work holder so that the adapter is able to coaxially hold the workpiece and the rotary caulking device is able to coaxially dispose the work holder and the adapter by engaging an adapter side engagement portion provided in the adapter with a work holder side engagement portion provided in the work holder at the time of attaching the adapter to the work holder. The light receiving unit includes a sensor which includes the laser irradiation surface and the sensor is able to acquire the laser beam irradiation position with respect to the laser irradiation surface as coordinate data in an orthogonal coordinate set on the laser irradiation surface. In the preparation step, the light receiving unit is attached to the work holder in a state in which the laser irradiation surface is orthogonal to the reference axis and an origin of the orthogonal coordinate is disposed on a center axis of the work holder by engaging a light receiving unit side engagement portion provided in the light receiving unit with the work holder side engagement portion.

The centering method of the rotary caulking device of the present invention can adopt the following configuration. That is, the light receiving unit includes a sensor which includes the laser irradiation surface and the sensor is able to acquire the laser beam irradiation position with respect to the laser irradiation surface as coordinate data in an orthogonal coordinate set on the laser irradiation surface. In the rotation body centering step, an operation of checking the trajectory of the irradiation position is repeated until the trajectory of the irradiation position changes to a desired shape while appropriately adjusting a direction of an orthogonal coordinate set on the laser irradiation surface by rotating the sensor within a virtual plane including the laser irradiation surface and adjusting a rotation body support position with respect to the frame within a virtual plane orthogonal to the reference axis.

The centering method of the rotary caulking device of the present invention can employ the following configuration. That is, the centering method further includes a work holder centering step of aligning a center position of the trajectory of the irradiation position to the center axis of the work holder on the laser irradiation surface by adjusting a work holder arrangement position with respect to the frame within a virtual plane orthogonal to the reference axis after the rotation body centering step ends.

The centering method of the rotary caulking device of the present invention can adopt the following configuration. That is, the light receiving unit includes a sensor which includes the laser irradiation surface and the sensor is able to acquire the laser beam irradiation position with respect to the laser irradiation surface as coordinate data in an orthogonal coordinate set on the laser irradiation surface. In the work holder centering step, the sensor is rotated within a virtual plane including the laser irradiation surface to appropriately adjust a direction of an orthogonal coordinate set on the laser irradiation surface and a work holder arrangement position with respect to the frame is adjusted within a virtual plane orthogonal to the reference axis to align a center position of a trajectory of the irradiation position to a center axis of the work holder on the laser irradiation surface.

The centering method of the rotary caulking device of the present invention can adopt the following configuration. That is, the centering method further includes a movement accuracy improvement step of relatively moving the frame and the work holder by a predetermined amount in the direction of the reference axis after the rotation body centering step ends and performing an adjustment operation for allowing a deviation amount between the center position of the trajectory before the relative movement and the center position of the trajectory after the relative movement to be inside an allowable range when the deviation amount is outside the allowable range.

The centering method of the rotary caulking device of the present invention can adopt the following configuration. That is, the centering method further includes a rotation accuracy improvement step of checking a change amount of the laser beam irradiation position with respect to the laser irradiation surface caused when rotating a coupling body of the rotating shaft, the convex spherical seat, and the laser head while allowing the laser irradiation surface to be irradiated with a laser beam emitted from the laser head in a state in which the rotation body is not rotated but is stopped after the preparation step ends and performing an adjustment operation (for example, an adjustment of a positional relationship between the concave spherical portion and the convex spherical portion in the axial direction of the rotating shaft) for allowing the change amount to be inside an allowable range when the change amount is outside the allowable range.

A method of manufacturing a rotary caulking device of the present invention manufactures a rotary caulking device by performing the centering method of the rotary caulking device of the present invention.

A hub unit bearing which is an object of the manufacturing method of the present invention includes a shaft member and an inner race which is fitted to the outside of the shaft member and has an axial end surface constrained by a caulking portion formed by plastically deforming a tubular portion provided at an axial end portion of the shaft member outward in a radial direction. In the method of manufacturing the hub unit bearing of the present invention, a rotary caulking device which is manufactured by the method of manufacturing the rotary caulking device of the present invention is used in order to manufacture the hub unit bearing. Specifically, the shaft member having the inner race fitted to the outside thereof is held by a work holder so that a center axis of the shaft member is coaxial with a reference axis and a frame and the work holder are relatively moved in a direction of the reference axis while rotating the rotation body to press the molding die against a tubular portion provided at an axial end portion of the shaft member and to plastically deform the tubular portion outward in a radial direction so that the caulking portion is formed.

A vehicle which is a manufacturing object of the present invention includes a hub unit bearing. In a method of manufacturing a vehicle of the present invention, the hub unit bearing is manufactured by the method of manufacturing the hub unit bearing of the present invention.

Another aspect of the present invention provides a centering method of a rotary caulking device. The rotary caulking device includes a frame, a rotation body which is supported by the frame to be rotatable about a reference axis, a concave spherical seat which includes a concave spherical surface and is fixed to the frame, a convex spherical seat which includes a convex spherical surface slidable on the concave spherical surface and precesses in accordance with the rotation of the rotation body, a molding die which is attached to the convex spherical seat, and a work holder which holds a workpiece. The centering method includes a preparation step including a step of attaching a laser head to the convex spherical seat instead of the molding die and a step of attaching a sensor to the work holder instead of the workpiece, an irradiation step of allowing the light receiving surface of the sensor to be irradiated with a laser beam from the laser head in a state in which the convex spherical seat precesses, and an adjustment step of mechanically adjusting the rotary caulking device on the basis of information on the trajectory of the irradiation position on the light receiving surface of the laser beam from the sensor.

Another aspect of the present invention provides a centering device of a rotary caulking device. The rotary caulking device includes a frame, a rotation body which is supported by the frame to be rotatable about a reference axis, a concave spherical seat which includes a concave spherical surface and is fixed to the frame, a convex spherical seat which includes a convex spherical surface slidable on the concave spherical surface and is configured to precess in accordance with the rotation of the rotation body, a molding die which is attached to the convex spherical seat, and a work holder which holds a workpiece. The centering device includes a laser head which is attached to the convex spherical seat instead of the molding die, a sensor which includes a light receiving surface receiving a laser beam from the laser head and is held by the work holder instead of the workpiece, and a display which displays the trajectory of the laser beam irradiation position on the light receiving surface on the basis of the signal output from the sensor.

Still another aspect of the present invention provides a rotary caulking system including a rotary caulking device and a centering device. The rotary caulking device includes a frame, a rotation body which is supported by the frame to be rotatable about a reference axis, a concave spherical seat which includes a concave spherical surface and is fixed to the frame, a convex spherical seat which includes a convex spherical surface slidable on the concave spherical surface and precesses in accordance with the rotation of the rotation body, a molding die which is attached to the convex spherical seat, and a work holder which holds a workpiece. The centering device includes a laser head which is attached to the convex spherical seat instead of the molding die, a sensor which includes a light receiving surface receiving a laser beam from the laser head and is held by the work holder instead of the workpiece, and a display which displays the trajectory of the laser beam irradiation position on the light receiving surface on the basis of the signal output from the sensor.

Advantageous Effects of Invention

According to an aspect of the present invention, it is possible to obtain satisfactory coaxiality between the concave spherical seat and the rotation body in the rotary caulking device. Thus, it is possible to improve the machining accuracy of the caulking portion.

BRIEF DESCRIPTION OF DRAWINGS

FIG. 6(a) shows a case in which the irradiation position does not change and FIG. 6(b) shows a case in which the irradiation position changes.

FIG. 7(a) shows a case in which the coaxiality is good and FIG. 7(b) shows a case in which the coaxiality is bad.

DESCRIPTION OF EMBODIMENTS

First Example of Embodiment

Figure 11:
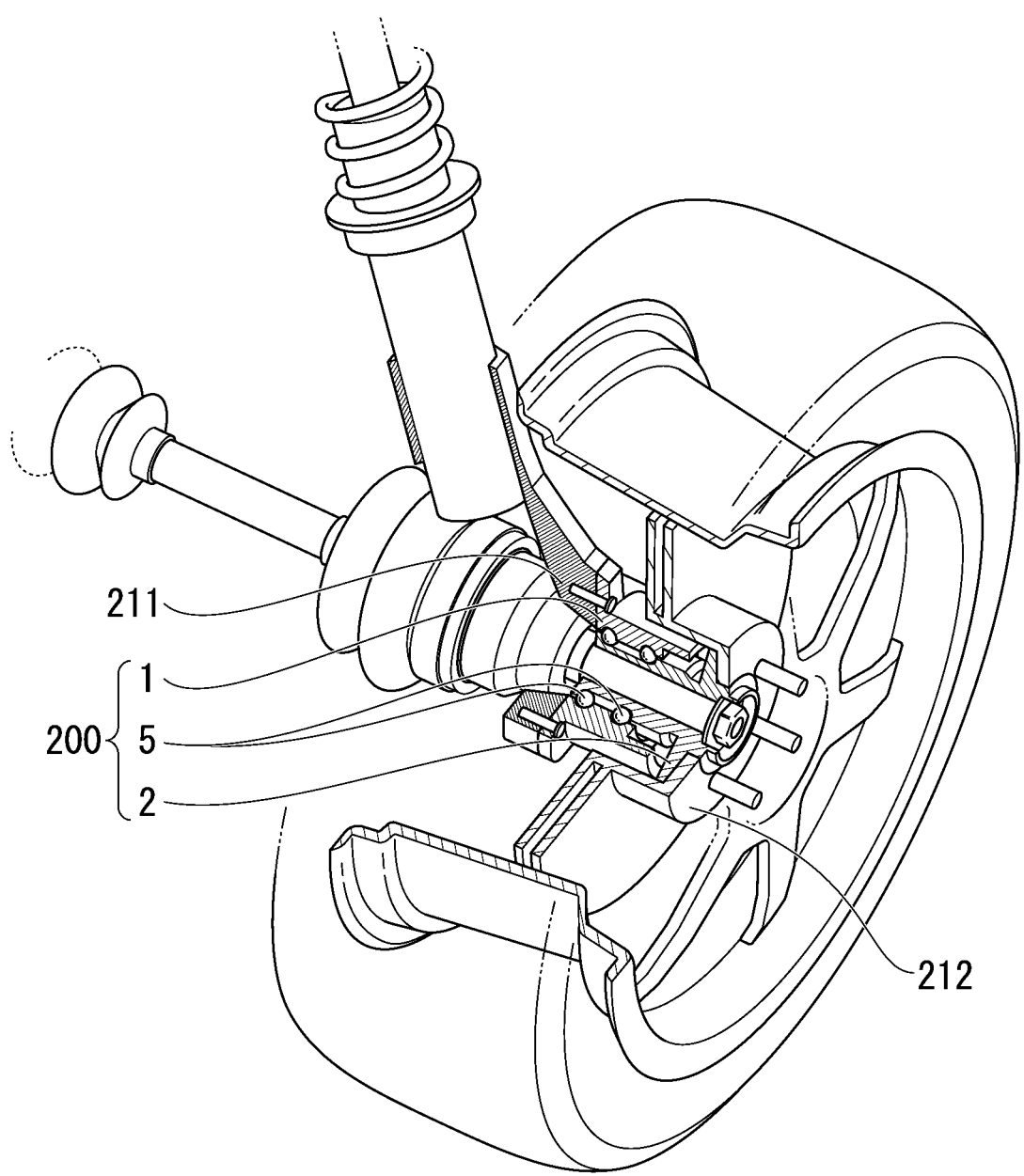
FIG. 11 is a partially schematic diagram of a vehicle including a hub unit bearing (a bearing unit).

FIG. 11 is a partially schematic diagram of a vehicle 210 including a hub unit bearing (a bearing unit) 200. The present invention can be applied to any one of a hub unit bearing for a drive wheel and a hub unit bearing for a driven wheel. In FIG. 11, the hub unit bearing 200 is used for a drive wheel and includes an outer race 1, a hub 2, and a plurality of rolling elements 5. The outer race 1 is fixed to a knuckle 211 of a suspension device by using a bolt or the like. A vehicle wheel (and a braking rotation body) 212 is fixed to a flange (a rotation flange) provided in the hub 2 by using a bolt or the like.

Figure 12:
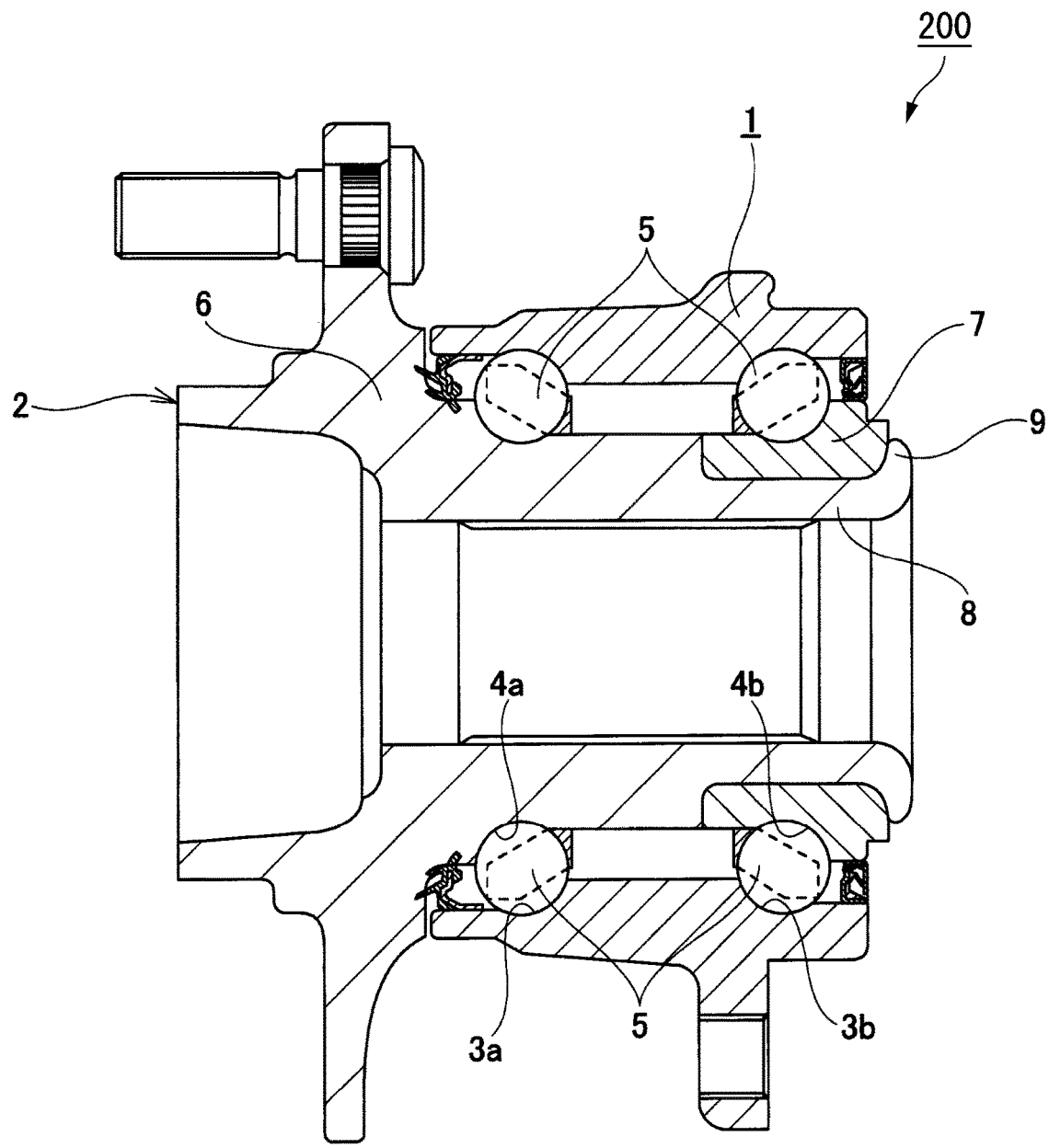
FIG. 12 is a cross-sectional view showing a first example of the hub unit bearing.

FIG. 12 shows an example of the hub unit bearing (the bearing unit) 200 for the drive wheel. A vehicle wheel of an automobile is rotatably supported to the suspension device by the hub unit bearing 200. The hub unit bearing 200 includes the outer race 1, the hub 2, and the plurality of rolling elements 5 and 5. The outer race 1 does not rotate while being coupled and fixed to a suspension device of a vehicle such as an automobile. The hub 2 rotates along with the vehicle wheel while supporting and fixing the vehicle wheel. Double rows of rolling elements 5 and 5 are disposed between double rows of outer race tracks 3a and 3b provided on the inner circumferential surface of the outer race 1 and double rows of inner race tracks 4a and 4b provided on the outer circumferential surface of the hub 2. The hub 2 is obtained by coupling and fixing the hub wheel 6 and the inner race 7 to each other. The hub wheel 6 is a shaft member of which an outer circumferential surface is provided with the inner race track 4a at the outside of the axial direction (the left side of FIG. 12). The outer circumferential surface of the inner race 7 is provided with the inner race track 4b at the inside of the axial direction (the right side of FIG. 12). In order to form the hub 2, specifically, an axial inner end surface of the inner race 7 is pressed by a caulking portion 9 which is formed by plastically deforming (caulking) a portion, protruding inward in the axial direction in relation to the inner race 7 in the cylindrical portion 8 provided in the inner portion of the hub wheel 6 in the axial direction, outward in the radial direction while the inner race 7 is fitted to the outside of the inner portion of the hub wheel 6 in the axial direction.

In a case in which such a hub unit bearing is manufactured, for example, a molding die (a pressing die) having a center axis inclined with respect to the center axis of the hub wheel 6 is pressed against the cylindrical portion 8. In this state, the caulking portion 9 can be formed by orbit pressing the molding die about the center axis of the hub wheel 6 in a rotating motion as the trajectory of the center axis caused by the precession movement.

A first example of the embodiment of the rotary caulking device will be described with reference to FIGS. 1 to 10. A rotary caulking device 110 of this example is used to form, for example, a caulking portion 9 of a hub unit bearing (a bearing unit) shown in FIG. 12. The rotary caulking device 110 includes a frame 10, a concave spherical seat 15, a shaft attachment spherical seat 11, a molding die 14, a rotation body 16, and a work holder 17.

Furthermore, in the following description of this example, the up and down direction means the up and down direction of FIGS. 1 to 5. Here, it is difficult to mention that the up and down direction of FIGS. 1 to 5 is essentially the same as the up and down direction during a machining operation. Further, in this example, the right and left direction of FIGS. 1 to 5 is defined as the X direction, the front and rear direction in the same drawings is defined as the Y direction, and the up and down direction in the same drawings is defined as the Z direction.

The frame 10 has a reference axis α disposed in the up and down direction (the Z direction) and is formed in a tubular shape in which a reference axis α is a center axis. Such a frame 10 is supported by a base (not shown).

The concave spherical seat 15 is formed in an annular shape and is fitted and fixed into the upper portion of the frame 10 coaxially with the reference axis α. The concave spherical seat 15 includes an annular concave spherical portion 18 which is formed in the lower surface in the axial direction.

The shaft attachment spherical seat 11 includes a rotating shaft 12 and a convex spherical seat 13. The rotating shaft 12 has a center axis β. The convex spherical seat 13 is formed into a partially spherical shape having an outer diameter dimension which is larger than that of the rotating shaft 12 and is coaxially fixed to the lower end portion of the rotating shaft 12 in the axial direction. The convex spherical seat 13 includes an annular convex spherical portion 19 which is provided on the upper surface in the axial direction. Such a shaft attachment spherical seat 11 inclines the center axis β of the rotating shaft 12 with respect to the reference axis α by a predetermined angle θ. Further, the rotating shaft 12 is disposed to be inserted through the concave spherical seat and the upper portion of the frame 10. Furthermore, the upper portion of the axial direction protrudes toward the upper side of the frame 10. Further, the convex spherical portion 19 of the convex spherical seat 13 spherically engages with the concave spherical portion 18 of the concave spherical seat 15. That is, the curvature radius of the convex spherical portion 19 is the same as the curvature radius of the concave spherical portion 18 and is slightly smaller than the curvature radius of the concave spherical portion 18. By the spherical engagement of the convex spherical portion 19 with respect to the concave spherical portion 18, the shaft attachment spherical seat 11 is allowed to gyrate about the reference axis α in a rotating motion as the trajectory of the center axis caused by the precession movement.

The molding die 14 is separably attached to the lower portion of the convex spherical seat 13 in the axial direction coaxially with the shaft attachment spherical seat 11 (the rotating shaft 12+the convex spherical seat 13). The molding die 14 includes an annular machined surface portion 20 which is provided on the lower surface in the axial direction.

Figure 2:
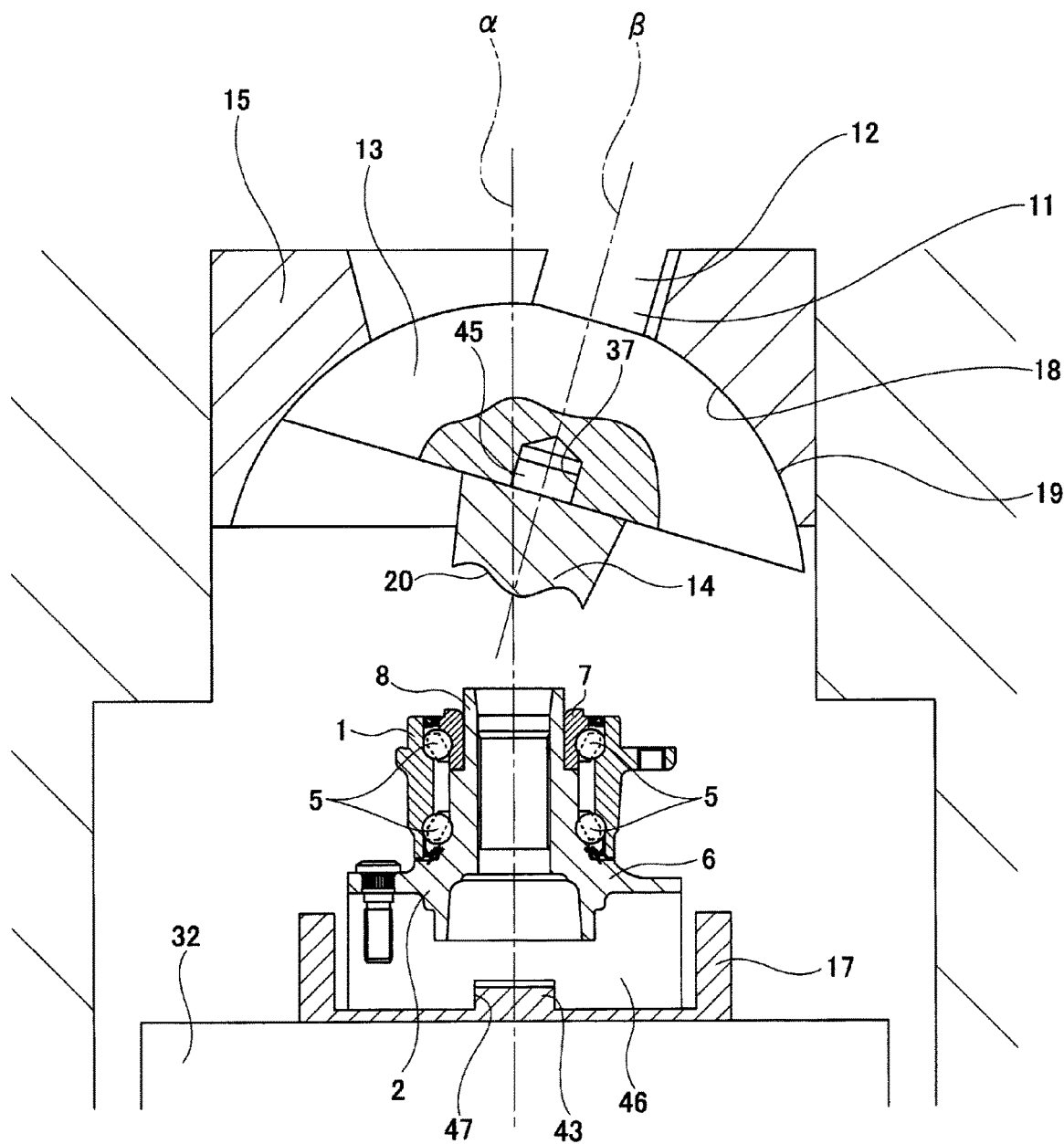
FIG. 2 is a partially enlarged cross-sectional view of FIG. 1.

Further, as shown in FIG. 2, the molding die 14 includes an engagement portion (a molding die side engagement portion) 45 which is provided in the upper portion in the axial direction. In the example shown in the drawings, the engagement portion 45 is a convex portion (a boss portion) which is provided in the radial center portion of the upper portion of the molding die 14 in the axial direction. Meanwhile, the convex spherical seat 13 includes an engagement portion (a convex spherical seat side engagement portion) 37 which is provided in the lower portion in the axial direction. In the example shown in the drawings, the engagement portion 37 is a concave portion which is provided in the radial center portion of the lower surface in the axial direction of the convex spherical seat 13. In this example, the shaft attachment spherical seat 11 (the rotating shaft 12+the convex spherical seat 13) and the molding die 14 can be coaxially disposed by the engagement (unevenness engagement) between the engagement portion 37 (the concave portion) and the engagement portion 45 (the convex portion) in a case in which the molding die 14 is attached to the convex spherical seat 13. Furthermore, in the case of the embodiment of the present invention, the engagement portion 45 can be set as a concave portion and the engagement portion 37 can be set as a convex portion.

The rotation body 16 is just rotatably supported by the frame 10 through the head casing 21 and the bearing device 22 coaxially with the frame 10 while being disposed above the frame 10. That is, the head casing 21 includes a tubular circumferential wall portion 23. The rotation body 16 is just rotatably supported inside the circumferential wall portion 23 through the bearing device 22. The head casing 21 is fixed to an upper surface of the frame 10 using a fixing member such as a bolt while the rotation center axis of the rotation body 16 is disposed coaxially with the reference axis α. A position in which the head casing 21 is fixed to the frame 10 is adjustable within a virtual plane (X-Y plane) orthogonal to the reference axis α. Further, an output portion of a motor (not shown) for rotationally driving the rotation body 16 about the rotation center axis coaxial with the reference axis α is directly connected to the rotation body 16 or is connected thereto through a speed reducer (not shown).

The rotation body 16 includes a holding hole 24 which is provided at one position in the circumferential direction at the radial outer portion to be inclined by the same angle θ as that of the center axis β of the rotating shaft 12 with respect to the reference axis α. The upper portion of the rotating shaft 12 in the axial direction is rotatably supported inside the holding hole 24 through a roller bearing 25. Further, in this state, a problem in which the rotating shaft 12 is displaced to the lower side in the axial direction with respect to the holding hole 24, that is, the rotating shaft is separated from the holding hole 24 is prevented.

For this reason, in this example, as the roller bearing 25, one having an axial load bearing capability as well as a radial load bearing capability, specifically, a self-aligning roller bearing is used. This self-aligning roller bearing can bear the radial load and the axial load applied between the outer race 26 and the inner race 27 by disposing a plurality of spherical rollers 28 respectively corresponding to rolling elements between the inner circumferential surface of the outer race 26 and the outer circumferential surface of the inner race 27. Further, even when the center axes of the outer race 26 and the inner race 27 are inclined, a property in which the spherical roller 28 can smoothly roll between the inner circumferential surface of the outer race 26 and the outer circumferential surface of the inner race 27, that is, a self aligning property is provided. Since a more detailed configuration of the self-aligning roller bearing is known variously from the past, a description thereof is omitted. Furthermore, in the case of the embodiment of the present invention, a deep groove ball bearing, an angular ball bearing, or the like can also be used as the roller bearing 25.

Further, the holding hole 24 is formed as a stepped hole in which a large-diameter hole portion at the upper side in the axial direction and a small-diameter hole portion at the lower side in the axial direction are connected to each other through a stepped surface 29 facing upward in the axial direction. The outer race 26 is fitted into a large-diameter hole portion of the holding hole 24 so that the lower end surface of the outer race 26 in the axial direction comes into contact with the stepped surface 29 of the holding hole 24. Accordingly, the displacement of the outer race 26 to the lower side in the axial direction with respect to the holding hole 24 is prevented. Further, the upper portion of the rotating shaft 12 in the axial direction is fitted into (inserted through) the inner race 27 to be relatively displaceable in the axial direction so that a nut 31 screwed to a male screw portion 30 provided in the upper portion of the rotating shaft 12 in the axial direction comes into contact the upper end surface of the inner race 27 in the axial direction. Accordingly, the displacement of the rotating shaft 12 to the lower side in the axial direction with respect to the inner race 27 is prevented. By adopting such a configuration, a problem in which the rotating shaft 12 is displaced to the lower side in the axial direction with respect to the holding hole 24 is prevented.

Further, in this example, since a gap (an engagement margin) existing in the spherical engagement portion between the convex spherical portion 19 and the concave spherical portion 18 is adjusted by changing a positional relationship between the convex spherical portion 19 and the concave spherical portion 18 with respect to the axial position of the rotating shaft 12 while adjusting the screwing position (the screwing amount) of the nut 31 with respect to the male screw portion 30, this gap can be appropriately set.

The work holder 17 is disposed below the molding die 14 coaxially with the reference axis α. Further, the work holder 17 is provided in the frame 10 to be movable in the up and down direction (the Z direction) by a movement table 32. That is, the movement table 32 is disposed at the lower portion inside the frame 10 and is provided in the frame 10 to be movable in the up and down direction along the reference axis α. A hydraulic mechanism (not shown) for moving the movement table 32 in the up and down direction is connected to the movement table 32.

The work holder 17 is formed in a bottomed cylindrical shape of which an upper end is opened and is fixed to an upper surface of the movement table 32 by using a fixing member such as a bolt while being disposed coaxially with the reference axis α. A position in which the work holder 17 is fixed to the upper surface of the movement table 32 is adjustable within a virtual plane (X-Y plane) orthogonal to the reference axis α. Further, the work holder 17 can coaxially hold a workpiece through an adapter 46. The adapter 46 is coaxially and sepaerably attached to the work holder 17. The adapter 46 is a jig having a shape corresponding to the type of workpiece and is able to coaxially hold the workpiece.

Further, as shown in FIG. 2, the adapter 46 includes an engagement portion (an adapter side engagement portion) 47 which is provided in the lower portion in the axial direction. In the example shown in the drawings, the engagement portion 47 is a concave portion which is provided in the radial center portion of the lower surface in the axial direction of the adapter 46. Meanwhile, the work holder 17 includes an engagement portion (a work holder side engagement portion) 43 which is formed in the upper surface of the bottom plate portion. In the example shown in the drawings, the engagement portion 43 is a convex portion which is provided in the radial center portion of the upper surface of the bottom plate portion of the work holder 17. In this example, in a case in which the adapter 46 is attached to the work holder 17, the work holder 17 and the adapter 46 can be coaxially disposed by the engagement (unevenness engagement) between the engagement portion 43 (the convex portion) and the engagement portion 47 (the concave portion). Furthermore, in the case of the embodiment of the present invention, the engagement portion 47 can be set as a convex portion and the engagement portion 43 can be set as a concave portion.

Next, a centering method which is performed at the time of manufacturing the rotary caulking device 110 of this example will be described. The centering method of the rotary caulking device 110 of this example includes a preparation step, a rotation accuracy improvement step, a rotation body centering step, a movement accuracy improvement step, and a work holder centering step.

Figure 4:
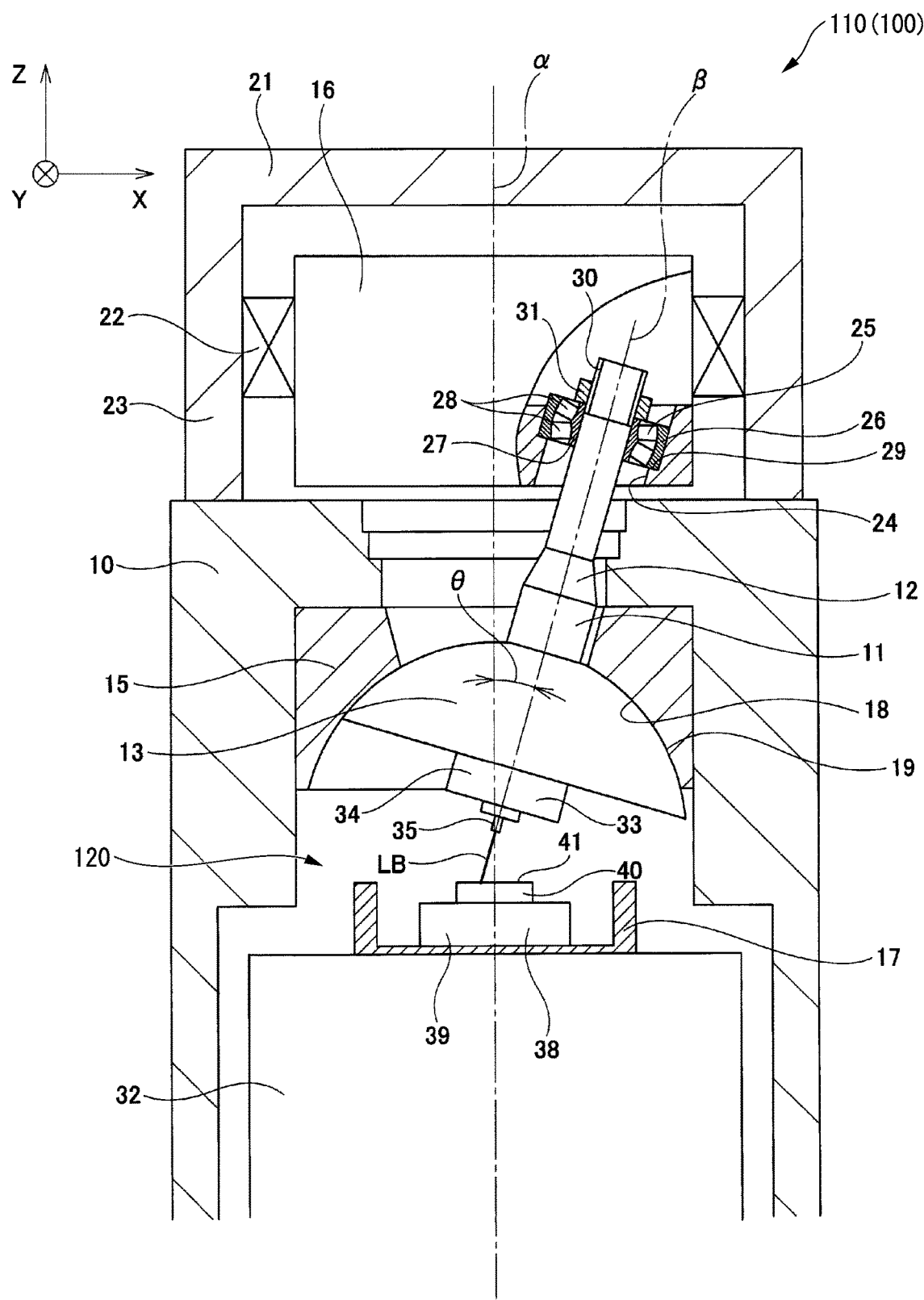
FIG. 4 is a schematic cross-sectional view showing the rotary caulking device according to the first example of the embodiment of the present invention after a preparation step is performed.

As shown in FIG. 4, the rotary caulking system 100 includes the rotary caulking device 110 and a centering device 120. As described above, the rotary caulking device 110 includes the frame 10, the rotation body 16, the concave spherical seat 15, the convex spherical seat 13, the molding die 14, and the work holder 17. The rotation body 16 is supported by the frame 10 to be rotatable about the reference axis. The concave spherical seat 15 includes a concave spherical surface (a concave spherical portion) 18 and is fixed to the frame 10. The convex spherical seat 13 includes a convex spherical surface (a convex spherical portion) 19 which is slidable on the concave spherical surface 18 and gyrates with the rotation of the rotation body 16. The molding die 14 is attached to the convex spherical seat 13.

The centering device 120 includes a laser head 35, a light receiving unit 38 with a sensor 40, and a display 50. The laser head 35 is attached to the convex spherical seat 13 instead of the molding die 14. The sensor 40 includes a light receiving surface 41 which receives a laser beam from the laser head 35. The sensor 40 is held by the work holder 17 instead of the workpiece. The sensor 40 outputs information (position information) relating to the laser beam irradiation position in the light receiving surface 41. The display 50 displays a laser beam irradiation position (and the trajectory of the irradiation position) in the light receiving surface 41 on the basis of the output signal from the sensor 40. The display 50 can include, for example, a controller including a computer (a CPU, a processor, and a circuit) and a memory.

(Preparation Step)

Figure 5:
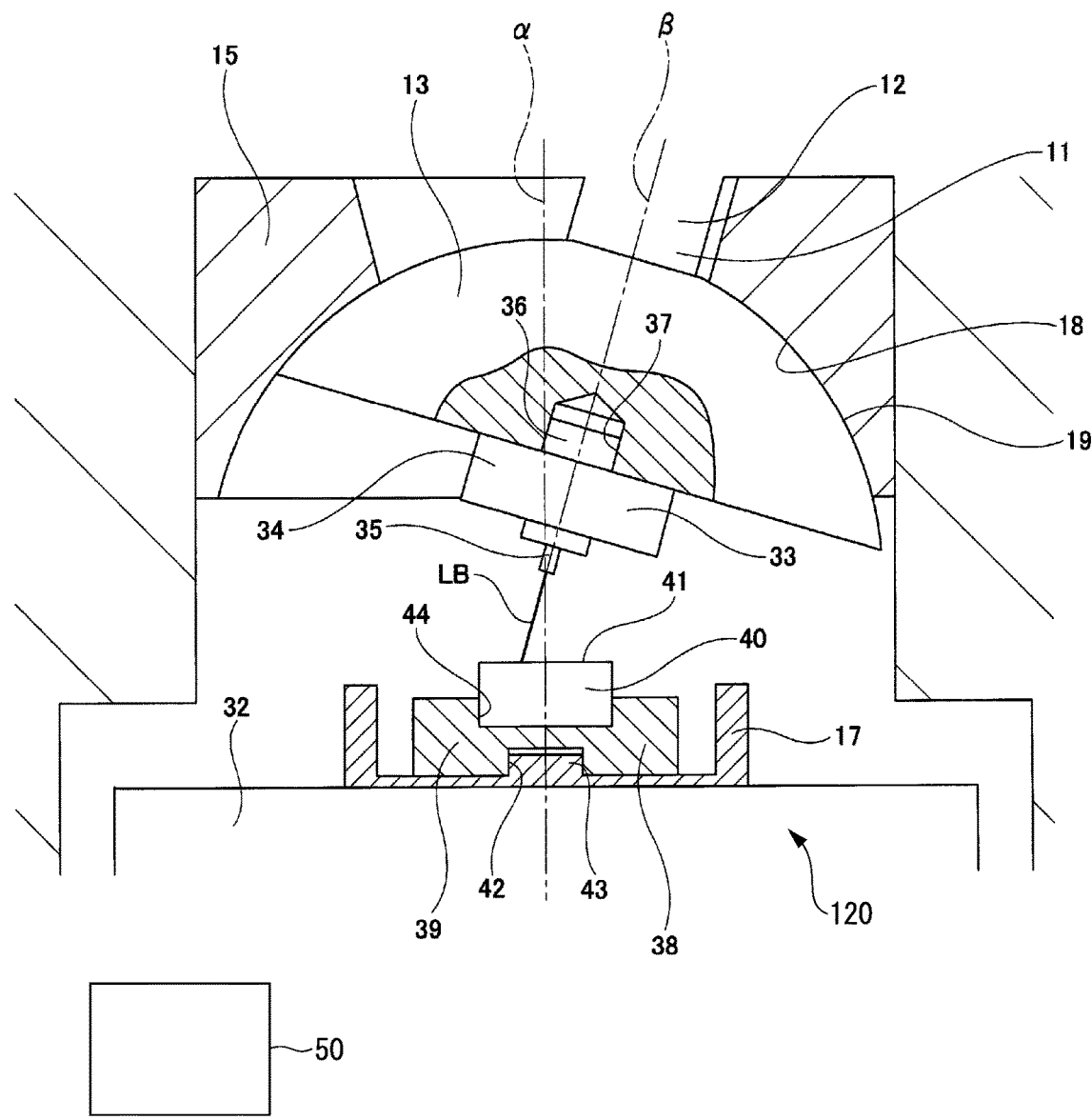
FIG. 5 is a partially enlarged cross-sectional view of FIG. 4.

In the preparation step, as shown in FIGS. 4 and 5, respective components other than the molding die 14 and the adapter 46 among respective components constituting the above-described rotary caulking device 110 are assembled. Specifically, the frame 10, the concave spherical seat 15, the shaft attachment spherical seat 11, the head casing 21, the bearing device 22, the rotation body 16, the roller bearing 25, the nut 31, the movement table 32, the work holder 17, the motor (and the speed reducer), and the hydraulic mechanism are assembled. In this example, in this step, the frame 10 and the concave spherical seat 15 are machined so that at least the coaxiality between the frame and the concave spherical seat 15, that is, the coaxiality between the reference axis α and the center axis of the concave spherical portion 18 sufficiently increases. In this example, this state is set as a reference for centering respective components.

Further, in the preparation step, as shown in FIGS. 4 and 5, a laser unit 33 (a laser head 35) which emits a laser beam onto the line of the center axis β of the rotating shaft 12 is attached to the convex spherical seat 13.

The laser unit 33 includes a stepped columnar attachment tool (a head adapter) 34 which is coaxially and sepaerably attached to the lower portion of the convex spherical seat 13 in the axial direction and a laser head 35. In an example, the laser unit 33 is of a type in which an oscillator (a laser generator) is built. In another example, the laser unit 33 is connected to a light source (a laser generator) provided separately. The laser head 35 is coaxially held by the lower portion of the attachment tool 34 in the axial direction and is able to emit a laser beam LB along the center axis of the attachment tool 34.

Further, as shown in FIG. 5, the attachment tool 34 includes an engagement portion (a head side engagement portion) 36 which is provided in the upper portion in the axial direction. In the example shown in the drawings, the engagement portion 36 is a convex portion (a boss portion) which is provided in the radial center portion of the upper portion in the axial direction of the attachment tool 34. In this example, in a case in which the attachment tool 34 is attached to the convex spherical seat 13, the convex spherical seat 13 and the attachment tool 34 (the laser head 33) can be coaxially disposed by the engagement (the unevenness engagement) between the engagement portion 37 (the concave portion) and the engagement portion 36 (the convex portion). That is, the laser beam LB can be emitted from the laser head 35 onto the line of the center axis β of the rotating shaft 12 in such a coaxial arrangement state. The engagement portion 37 provided in the convex spherical seat 13 can be applied to both the molding die 14 and the laser unit 33. The laser unit 33 (the laser head 35) can be attached to the same engagement portion 37 as the molding die 14. Furthermore, in the case of the embodiment of the present invention, the engagement portion 36 is set as a concave portion when the engagement portion 37 is set as a convex portion as described above.

Further, in the preparation step, as shown in FIGS. 4 and 5, the light receiving unit 38 including the light receiving surface (the laser irradiation surface) 41 having a planar shape orthogonal to the reference axis α is attached to the work holder 17.

The light receiving unit 38 includes a columnar attachment tool (a sensor adapter) 39 which is coaxially and sepaerably attached to the upper surface of the bottom plate portion of the work holder 17 and a sensor 40. The sensor 40 is coaxially held by the upper portion in the axial direction of the attachment tool 39. Specifically, the lower portion of the sensor 40 in the axial direction is fitted and held into a holding concave hole 44 provided in the radial center portion of the upper surface of the attachment tool 39 in the axial direction. Further, the sensor 40 is a planar image sensor such as a CCD and a CMOS and includes a planar laser irradiation surface 41 which is provided in the upper surface in the axial direction to be orthogonal to the center axis. The sensor 40 can acquire the irradiation position of the laser beam LB with respect to the laser irradiation surface 41 as the coordinate data of the orthogonal coordinate (X-Y coordinate) set on the laser irradiation surface 41. The origin of the orthogonal coordinate is set on the radial center portion of the laser irradiation surface 41 (the center axis of the sensor 40).

Further, as shown in FIG. 5, the attachment tool 39 includes an engagement portion (a light receiving unit side engagement portion) 42. In the example shown in the drawing, the engagement portion 42 is a concave portion which is provided in the radial center portion of the lower surface in the axial direction of the attachment tool 39. In this example, in a case in which the attachment tool 39 is attached to the work holder 17, the work holder 17 and the attachment tool 39 (the light receiving unit 38) can be coaxially disposed by the engagement (unevenness engagement) between the engagement portion 43 (the convex portion) and the engagement portion 42 (the concave portion). That is, in such a coaxial arrangement state, the laser irradiation surface 41 is orthogonal to the center axis (=the reference axis α) of the work holder 17 and the origin of the orthogonal coordinate set in the laser irradiation surface 41 is disposed on the center axis of the work holder 17. The engagement portion 43 which is provided in the work holder 17 can be attached to both the adapter 46 for the workpiece and the attachment tool (the sensor adapter) 39 for the light receiving unit 38. The light receiving unit 38 (the sensor 40) can be attached to the same engagement portion 43 as the workpiece. Furthermore, in the case of the embodiment of the present invention, the engagement portion 42 is set as a convex portion when the engagement portion 43 is set as a concave portion as described above.

(Rotation Accuracy Improvement Step)

When the preparation step ends, the rotation accuracy improvement step is performed as a next step. In the rotation accuracy improvement step, the shaft attachment spherical seat 11 is rotated while allowing the laser irradiation surface 41 to be irradiated with the laser beam LB emitted from the laser head 33 in a state in which the rotation body 16 is not rotated but stopped.

Figure 6:
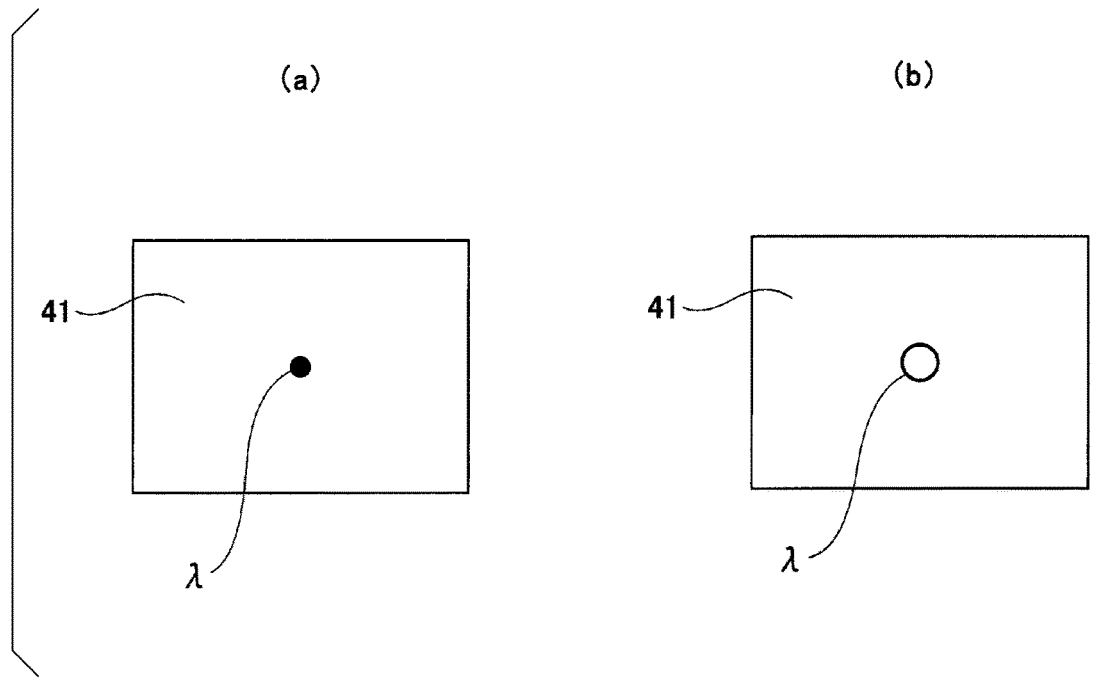
FIG. 6 is a diagram showing a laser beam irradiation position when performing a rotation accuracy improvement step in the first example of the embodiment of the present invention, where

At this time, when an irradiation position λ of the laser beam LB with respect to the laser irradiation surface 41 does not change, that is, the irradiation position λ stays at one point as shown in FIG. 6(*a*), the rotation accuracy of the shaft attachment spherical seat 11 is improved. In contrast, when the irradiation position λ of the laser beam LB with respect to the laser irradiation surface 41 changes, that is, the trajectory of the irradiation position λ draws a circle or a non-circular ring as shown in FIG. 6(*b*), the rotation accuracy of the shaft attachment spherical seat 11 becomes poor. Here, deterioration of rotation accuracy is often caused by the rattling of the spherical engagement portion between the concave spherical portion 18 and the convex spherical portion 19.

In any case, when the rotation accuracy of the shaft attachment spherical seat 11 is too poor, there is a possibility that necessary caulking machining accuracy cannot be obtained. Therefore, in this example, the rotation accuracy of the shaft attachment spherical seat 11 is checked by a change amount of the irradiation position λ of the laser beam LB with respect to the laser irradiation surface 41 (for example, a diameter or the like of a circumscribed circle of the trajectory of the irradiation position λ). This checking is performed by using the output data of the sensor 40. When the checked change amount is outside the allowable range (the rotation accuracy of the shaft attachment spherical seat 11 is too poor), an operation of allowing the change amount to be inside the allowable range is performed. Specifically, a gap existing in the spherical engagement portion between the concave spherical portion 18 and the convex spherical portion 19 is appropriately decreased by adjusting the screwing position (the screwing amount) of the nut 31 with respect to the male screw portion 30 so that the rattling of the spherical engagement portion between the concave spherical portion 18 and the convex spherical portion 19 is suppressed. That is, the gap is decreased to a degree that the sliding resistance of the convex spherical portion 19 with respect to the concave spherical portion 18 does not increase excessively. Furthermore, since there is a case in which the change amount of the irradiation position λ of the laser beam LB with respect to the laser irradiation surface 41 is changed by the gap between the laser head 33 and the light receiving unit 38, an allowable range of the change amount is set in consideration of the gap in that case.

(Rotation Body Centering Step)

When the rotation accuracy improvement step ends, the rotation body centering step is performed as a next step. In the rotation body centering step, the shaft attachment spherical seat 11 is allowed to gyrate as the trajectory of the center axis due to the precession movement by rotating the rotation body 16 while allowing the laser irradiation surface 41 to be irradiated with the laser beam LB emitted from the laser head 33. Then, the irradiation position λ of the laser beam LB with respect to the laser irradiation surface 41 changes so that the trajectory of the irradiation position λ is drawn on the laser irradiation surface 41.

Figure 7:
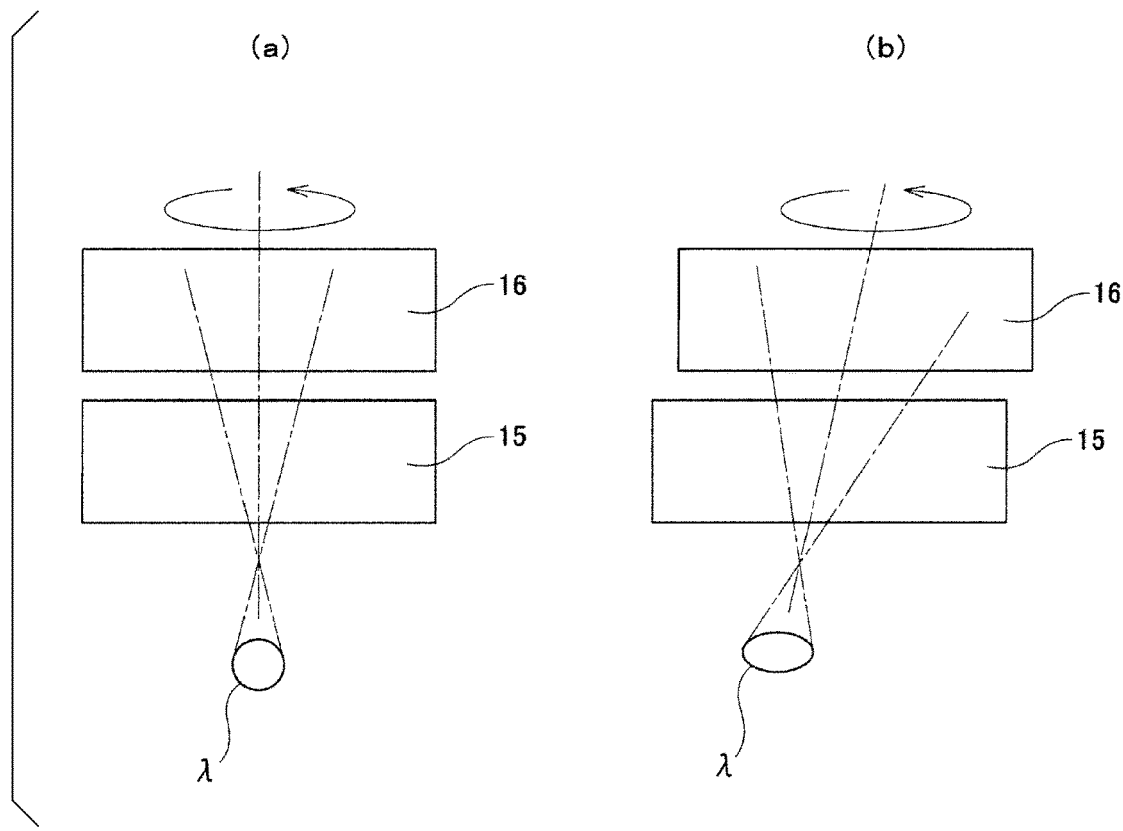
FIG. 7 is a diagram showing an influence of coaxiality between a concave spherical seat and a rotation body with respect to a trajectory of a laser beam irradiation position when performing a rotation body centering step in the first example of the embodiment of the present invention, where

At this time, when the center axis (the reference axis α) of the concave spherical seat 15 is the same as the rotation center axis of the rotation body 16 (the coaxiality is good), the trajectory of the irradiation position λ has a circular shape as schematically shown in FIG. 7(*a*). In contrast, when the center axis of the concave spherical seat 15 deviates from the rotation center axis of the rotation body 16 (the coaxiality is poor), the trajectory of the irradiation position λ has an oval shape as schematically shown in FIG. 7(*b*). A direction of the long axis of the oval shape indicates a direction in which the center axis of the concave spherical seat 15 deviates from the rotation center axis of the rotation body 16. When the center axis of the concave spherical seat 15 deviates from the rotation center axis of the rotation body 16, the center axis of the gyration motion of the molding die 14 is inclined with respect to the reference axis α so that the caulking machining accuracy is poor.

Figure 8:
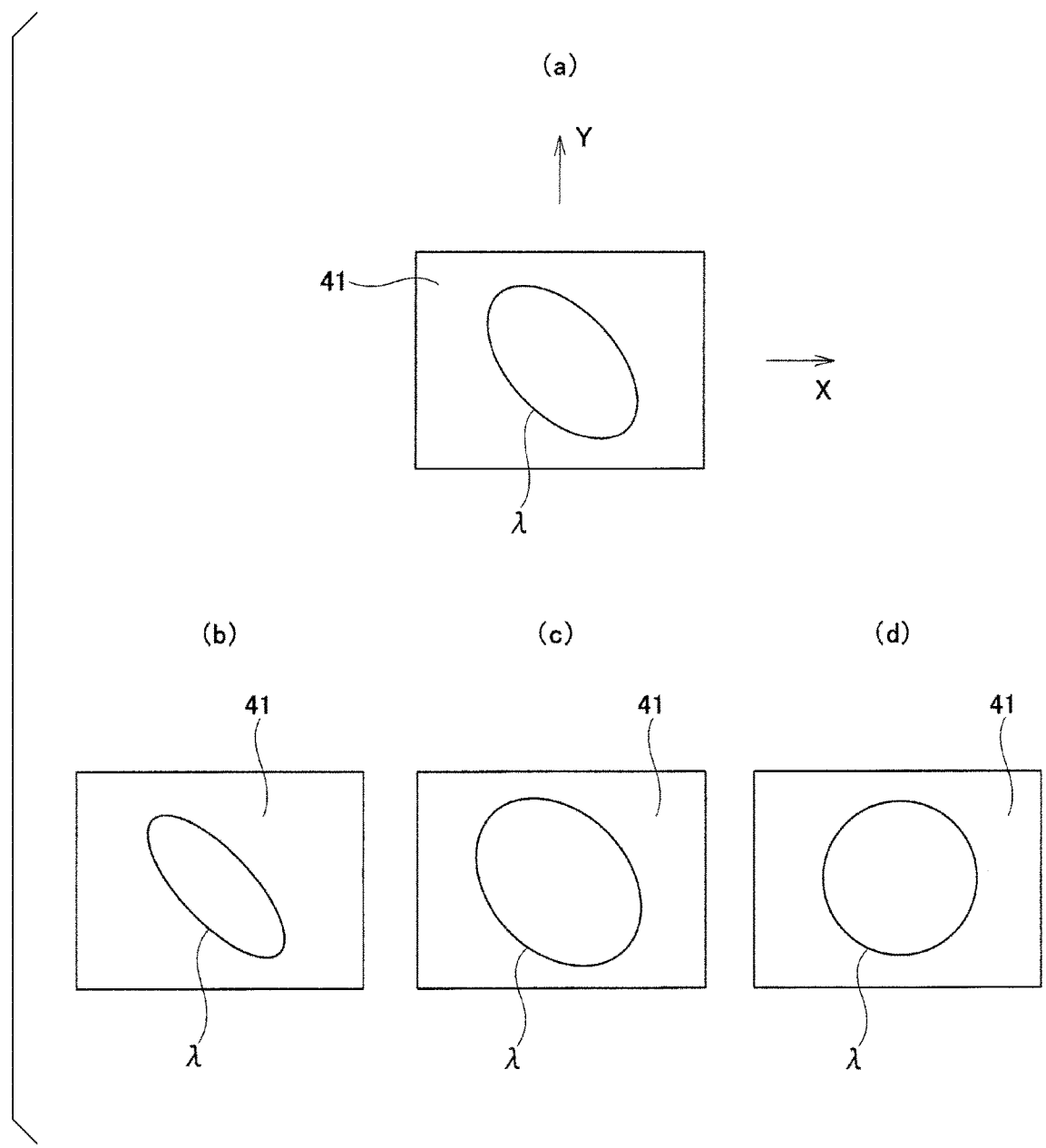
FIG. 8 is a diagram sequentially showing a procedure in which a shape of the trajectory of the laser beam irradiation position changes from an oval shape to a circular shape in the order of steps in accordance with the rotation body centering step in the first example of the embodiment of the present invention.

Therefore, in this example, the trajectory of the irradiation position λ is checked while being displayed on the display (a monitor and a display unit) 50. When the checked trajectory of the irradiation position λ has an oval shape, for example, as shown in FIG. 8(*a*), that is, an oval shape in which a direction of a long axis is inclined with respect to each of the X direction and the Y direction, the fixed position of the head casing 21 with respect to the frame 10 (the support position of the rotation body 16 with respect to the frame 10) is moved in the X direction or the Y direction. At each time, the shaft attachment spherical seat 11 is allowed to precess and then the trajectory of the irradiation position λ is checked. For example, when the shape of the trajectory of the irradiation position λ moves away from the circular shape (when a difference between the length of the long axis and the length of the short axis of the oval shape becomes large) as shown in FIG. 8(*b*) as a result of moving the fixed position of the head casing 21 with respect to the frame 10 to one side in the X direction, the fixed position is moved to the other side in the X direction so that the shape of the trajectory of the irradiation position λ can moves close to the circular shape (a difference between the length of the long axis and the length of the short axis of the oval shape can become small) as shown in FIG. 8(*c*). Regarding this point, the same also applies to a case in which the fixed position of the head casing 21 with respect to the frame 10 is moved in the Y direction. The adjustment of the fixed position in the X direction and the Y direction is repeated until the trajectory of the irradiation position λ has a circular shape corresponding to a desired shape, that is, the center axis of the concave spherical seat 15 (the reference axis α) is the same as the rotation center axis of the rotation body 16 (the coaxiality is good) as shown in FIG. 8(*d*). Furthermore, in the case of the embodiment of the present invention, the desired shape can be an oval shape similar to a circular shape (for example, an oval shape in which a ratio between the length of the long axis and the length of the short axis of the oval shape becomes a predetermined value close to "1") instead of a perfect circular shape.

Further, in the case of the embodiment of the present invention, in order to facilitate the adjustment operation here, the following configuration can be adopted. That is, the sensor 40 is formed in a columnar shape so that the sensor 40 is rotatable about its center axis (within a virtual plane including the laser irradiation surface 41) with respect to the holding concave hole 44. In this way, the sensor 40 is rotated to adjust a direction of an orthogonal coordinate set on the laser irradiation surface 41 (an orthogonal coordinate of software for executing a data process of the irradiation position λ) so that the X axis (or the Y axis) of the orthogonal coordinate is aligned to the long axis direction of the oval shape. That is, the X direction and the Y direction shown in FIGS. 1 and 4 are set again. In this way, since the fixed position of the head casing 21 is adjusted only in the X direction (or the Y direction), the trajectory of the irradiation position λ can be set as a circular shape.

In any case, in this example, when the trajectory of the irradiation position λ has a circular shape, the fixed position is set as a final fixed position.

(Movement Accuracy Improvement Step)

When the rotation body centering step ends, the movement accuracy improvement step is performed as a next step. In the movement accuracy improvement step, the movement table 32 (the work holder 17) is moved upward (or downward) by a predetermined amount with respect to the frame 10. At the same time, the center coordinate of the trajectory (the circular shape) of the irradiation position λ before movement and the center coordinate of the trajectory (the circular shape) of the irradiation position λ after movement are respectively checked. This checking is performed by using the output data of the sensor 40.

Figure 9:
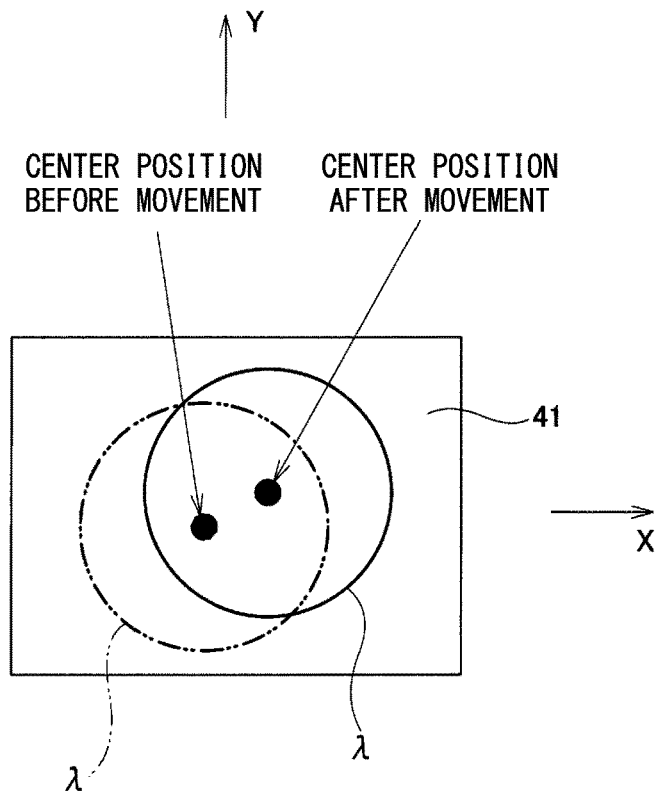
FIG. 9 is a diagram showing the trajectory of the laser beam irradiation position when performing a movement accuracy improvement step in the first example of the embodiment of the present invention.

Here, when the center coordinates do not match but deviate from each other as shown in FIG. 9, there is a possibility that the accuracy of the parallelization, the right angle, and the flatness of respective components including the movement table 32 lacks. When the deviation amount corresponding to the deviation degree is excessively large, there is a possibility that necessary caulking machining accuracy cannot be obtained. Therefore, in this example, when the deviation amount is outside the allowable range, an adjustment operation of allowing the deviation amount to be inside the allowable range is performed. Specifically, the rotary caulking device 110 is disassembled in an appropriate range and the accuracy of each component is checked. The component having poor accuracy is replaced by a component having good accuracy and a process starts again from the preparation step. This operation is repeated until the deviation amount enters the allowable range and the next work holder centering step is performed.

(Work Holder Centering Step)

In the work holder centering step, it is checked whether there is a deviation between the center position of the trajectory (the circular shape) of the irradiation position λ, for example, the center position of the trajectory (the circular shape) of the irradiation position λ after the movement of the movement table 32 (the work holder 17) checked in the previous movement accuracy improvement step and the origin of the orthogonal coordinate set on the laser irradiation surface 41 (the center axis of the work holder 17). When there is a deviation, the caulking machining accuracy deteriorates.

Figure 10:
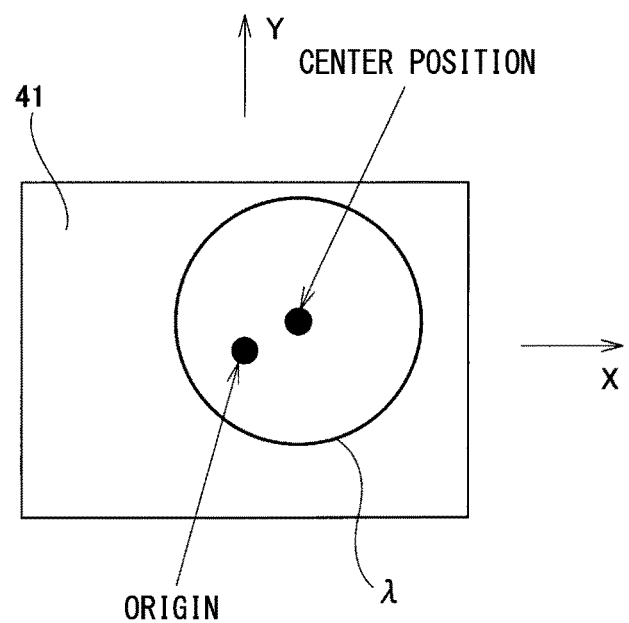
FIG. 10 is a diagram showing the trajectory of the laser beam irradiation position when performing a work holder centering step in the first example of the embodiment of the present invention.

Therefore, in this example, when the center position of the trajectory (the circular shape) of the irradiation position λ deviates from the origin of the orthogonal coordinate set on the laser irradiation surface 41 in each of the X direction and the Y direction, for example, as shown in FIG. 10, the fixed position of the work holder 17 with respect to the movement table 32 (the arrangement position of the work holder 17 with respect to the frame 10) is moved in the X direction or the Y direction. Then, at each time, the shaft attachment spherical seat 11 is allowed to precess and the center position of the trajectory (the circular shape) of the irradiation position λ is checked. Such an adjustment of the fixed position is repeated until the center position of the trajectory (the circular shape) of the irradiation position λ is the same as the origin of the orthogonal coordinate set on the laser irradiation surface 41, that is, the center axis of the concave spherical seat 15 (the reference axis α) is the same as the center axis of the work holder 17 (the coaxiality is good).

Furthermore, in the case of the embodiment of the present invention, the following configuration can be adopted in order to facilitate the adjustment operation. That is, as described in the rotation body centering step, the sensor 40 is allowed to be rotatable about its center axis (within a virtual plane including the laser irradiation surface 41) with respect to the holding concave hole 44. In this way, the sensor 40 is rotated to adjust the direction of the orthogonal coordinate set on the laser irradiation surface 41 (the orthogonal coordinate of the software for executing a data process of the irradiation position λ) so that the X axis (or the Y axis) of the orthogonal coordinate is aligned to the deviation direction. That is, the X direction and the Y direction shown in FIGS. 1 and 4 are set again. In this way, the fixed position of the work holder 17 is adjusted only in the X direction (or the Y direction) so that the center position of the trajectory (the circular shape) of the irradiation position λ is the same as the origin of the orthogonal coordinate set on the laser irradiation surface 41.

In any case, in this example, when the center position of the trajectory (the circular shape) of the irradiation position λ is the same as the origin of the orthogonal coordinate set on the laser irradiation surface 41, the fixed position is set as a final fixed position.

Furthermore, in the case of the embodiment of the present invention, the rotation accuracy improvement step can be performed at an appropriate timing after the preparation step ends. For example, the rotation accuracy improvement step can be performed after the rotation body centering step, the work holder centering step, or the movement accuracy improvement step. Further, the movement accuracy improvement step can be performed at an appropriate timing after the rotation body centering step ends. For example, the movement accuracy improvement step can be performed after the work holder centering step or the rotation accuracy improvement step. Further, each of the rotation accuracy improvement step, the movement accuracy improvement step, and the work holder centering step can be appropriately omitted as long as the coaxiality can be secured by the assembly performed while the attachment structure of each component or the accuracy of each component is checked.

Figure 1:
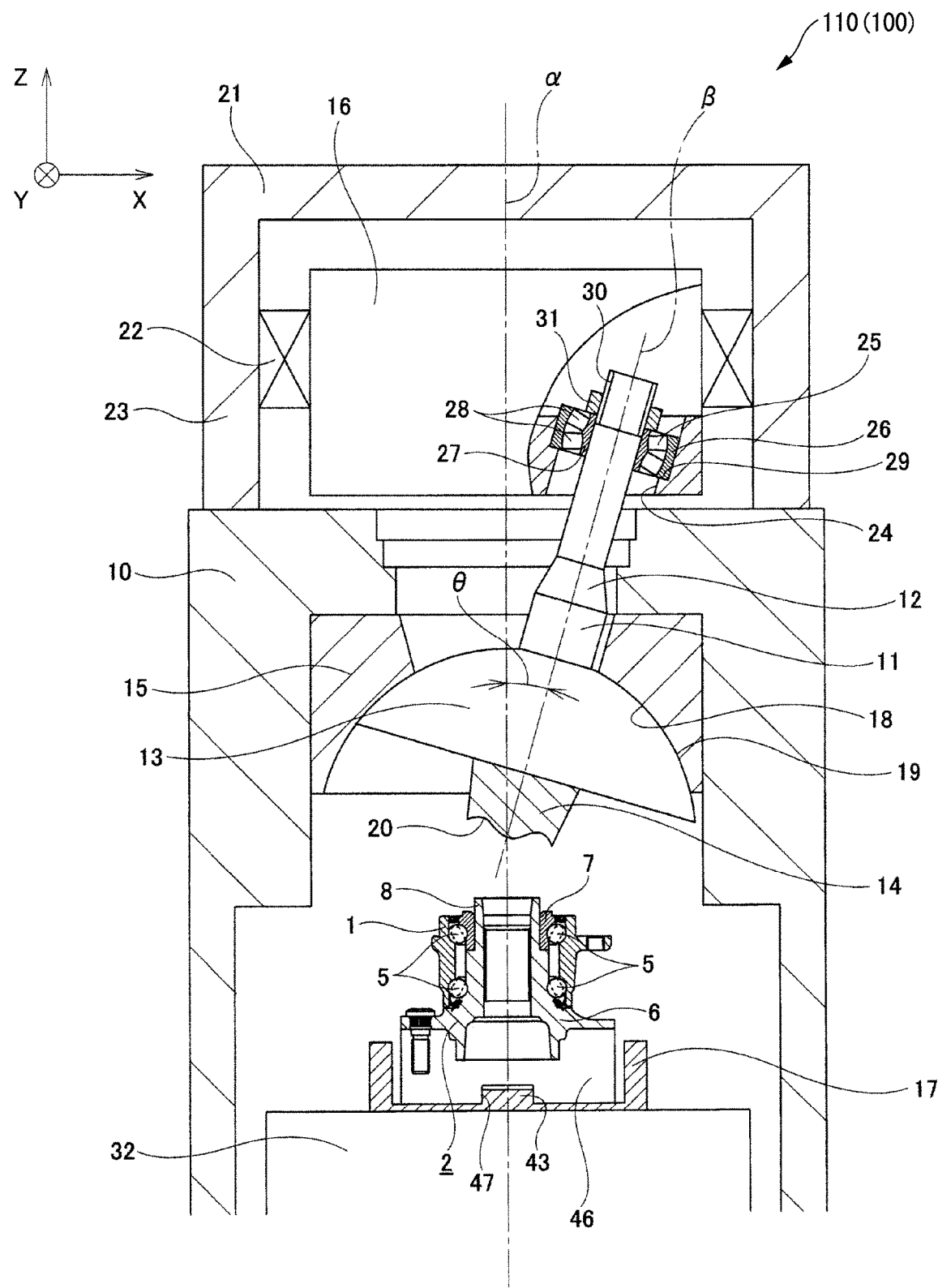
FIG. 1 is a schematic cross-sectional view showing a rotary caulking device according to a first example of the embodiment of the present invention.
Figure 3:
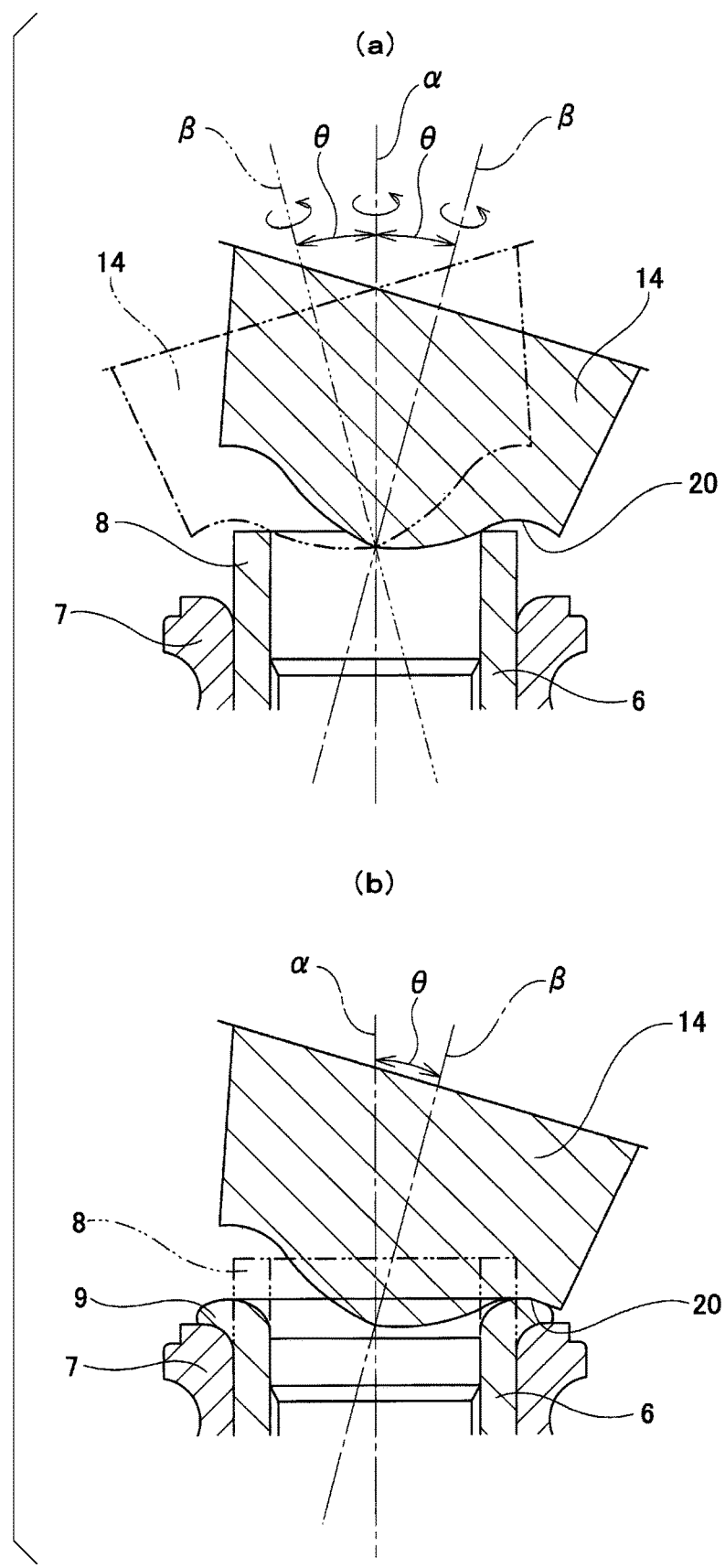
FIG. 3 is a main enlarged cross-sectional view showing an operation of forming a caulking portion by the rotary caulking device according to the first example of the embodiment of the present invention in the order of steps.

In a case in which the caulking portion 9 is formed at the inner axial end portion of the hub wheel 6 by the rotary caulking device 110 of this example, the hub wheel 6 corresponding to the workpiece is coaxially held by the work holder 17 (through the adapter 46) as shown in FIGS. 1 and 2 in a state in which other components constituting the hub unit bearing and the hub wheel 6 to be provided with the caulking portion 9 are assembled. In this state, the coupling body of the shaft attachment spherical seat 11 and the molding die 14 is allowed to gyrate as the trajectory of the center axis due to the precession movement about the reference axis α by using the spherical engagement portion between the convex spherical portion 19 and the concave spherical portion 18 as a pivot point when the rotation body 16 rotates. The movement table 32 is moved upward in parallel to such precession motion so that the machined surface portion 20 of the molding die 14 is pressed against the cylindrical portion 8 of the hub wheel 6 as shown in FIG. 3(*a*). Accordingly, a machining force is applied from the molding die 14 to the cylindrical portion 8 downward in the up and down direction and outward in the radial direction and a portion to which the machining force is applied is continuously changed in the circumferential direction. Accordingly, as shown from FIG. 3(*a*) to FIG. 3(*b*), the cylindrical portion 8 is gradually plastically deformed outward in the radial direction to form the caulking portion 9 and the axial inner end surface of the inner race 7 is pressed by the caulking portion 9.

In a case in which the caulking portion 9 is formed in this way, the molding die 14 performs the above-described gyrating motion while rotating about the center axis R based on the frictional force acting on the contact portion with the cylindrical portion 8. That is, the contact of the molding die 14 with respect to the cylindrical portion 8 becomes a rolling contact. For this reason, the abrasion or heat of the contact portion is sufficiently suppressed. Further, a machining reaction force applied from the cylindrical portion 8 to the molding die 14 can be efficiently supported by the concave spherical seat 15.

Further, since the rotary caulking device of this example is manufactured by performing the rotation accuracy improvement step, the rotation body centering step, the movement accuracy improvement step, and the work holder centering step, it is possible to obtain satisfactory centering accuracy or the like adjusted by these steps and to improve the machining accuracy of the caulking portion 9. As a result, since a force which is applied from the caulking portion 9 to the axial inner end surface of the inner race 7 can become even in the circumferential direction, a preload of the rolling element can become even in the circumferential direction.

REFERENCE SIGNS LIST

1 Outer race
2 Hub
3a, 3b Outer race track
4a, 4b Inner race track
5 Rolling element
6 Hub wheel
7 Inner race
8 Cylindrical portion
9 Caulking portion
10 Frame
11 Shaft attachment spherical seat
12 Rotating shaft
13 Convex spherical seat
14 Molding die
15 Concave spherical seat
16 Rotation body
17 Work holder
18 Concave spherical portion
19 Convex spherical portion
20 Machined surface portion
21 Head casing
22 Bearing device
23 Circumferential wall portion
24 Holding hole
25 Roller bearing
26 Outer race
27 Inner race
28 Spherical roller
29 Stepped surface
30 Male screw portion
31 Nut
32 Movement table
33 Laser unit
34 Attachment tool
35 Laser head
36 Centering convex portion
37 Convex spherical seat side engagement portion
38 Light receiving unit
39 Attachment tool
40 Sensor
41 Laser irradiation surface
42 Light receiving unit side engagement portion
43 Work holder side engagement portion
44 Holding concave hole
45 Molding die side engagement portion
46 Adapter
47 Adapter side engagement portion

The invention claimed is:

1. A centering method of a rotary caulking device including a frame which has a reference axis, an annular concave spherical seat which is fixed to the frame and includes a concave spherical portion provided in one side surface in a direction of the reference axis to be coaxial with the reference axis, a convex spherical seat which includes a convex spherical portion spherically engaging with the concave spherical portion, a rotation body which is supported by the frame to be rotatable about a center axis coaxial with the reference axis, a rotating shaft which is inserted through the concave spherical seat while being inclined with respect to the reference axis and is provided so that one side portion in the direction of the reference axis is fixed to the convex spherical seat and the other side portion in the direction of the reference axis is rotatably supported at one circumferential position of the rotation body, a molding die which is attached to the convex spherical seat, and a work holder which is disposed at the side opposite to the rotation body with the molding die interposed therebetween in the direction of the reference axis and is provided to be relatively movable with respect to the frame in the direction of the reference axis and to hold a workpiece, the centering method comprising:

a preparation step of assembling the frame, the concave spherical seat, the convex spherical seat, the rotation body, the rotating shaft, and the work holder, attaching a laser head emitting a laser beam onto a center axis of the rotating shaft to the convex spherical seat, and attaching a light receiving unit including a planar laser irradiation surface orthogonal to the reference axis to the work holder; and a rotation body centering step of repeating an operation of changing a laser beam irradiation position with respect to the laser irradiation surface by rotating the rotation body while allowing the laser irradiation surface to be irradiated with a laser beam emitted from the laser head and checking a trajectory of the irradiation position until the trajectory of the irradiation position changes to a predetermined shape while adjusting a rotation body support position with respect to the frame within a virtual plane orthogonal to the reference axis after the preparation step ends.

2. The centering method of the rotary caulking device according to claim 1, further comprising:

a work holder centering step of aligning a center position of the trajectory of the irradiation position to the center axis of the work holder on the laser irradiation surface by adjusting a work holder arrangement position with respect to the frame within a virtual plane orthogonal to the reference axis after the rotation body centering step ends.

3. The centering method of the rotary caulking device according to claim 2, wherein the light receiving unit includes a sensor which includes the laser irradiation surface and the sensor is able to acquire the laser beam irradiation position with respect to the laser irradiation surface as coordinate data in an orthogonal coordinate set on the laser irradiation surface, and wherein in the work holder centering step, the sensor is rotated within a virtual plane including the laser irradiation surface to appropriately adjust a direction of an orthogonal coordinate set on the laser irradiation surface and the work holder arrangement position with respect to the frame is adjusted within a virtual plane orthogonal to the reference axis to align a center position of a trajectory of the irradiation position to a center axis of the work holder on the laser irradiation surface.

4. The centering method of the rotary caulking device according to claim 1,
   wherein the rotary caulking device is able to coaxially dispose the rotating shaft and the molding die by engaging a molding die side engagement portion provided in the molding die with a convex spherical seat side engagement portion provided in the convex spherical seat at the time of attaching the molding die to the convex spherical seat, and
   wherein in the preparation step, the laser head is attached to the convex spherical seat while a laser beam emitted from the laser head is able to be emitted onto the center axis of the rotating shaft by engaging a head side engagement portion provided in an attachment tool for the laser head with the convex spherical seat side engagement portion.

5. The centering method of the rotary caulking device according to claim 1,
   wherein the rotary caulking device includes an adapter attached to the work holder so that the adapter is able to coaxially hold the workpiece and the rotary caulking device is able to coaxially dispose the work holder and the adapter by engaging an adapter side engagement portion provided in the adapter with a work holder side engagement portion provided in the work holder at the time of attaching the adapter to the work holder,
   wherein the light receiving unit includes a sensor which includes the laser irradiation surface and the sensor is able to acquire the laser beam irradiation position with respect to the laser irradiation surface as coordinate data in an orthogonal coordinate set on the laser irradiation surface, and
   wherein in the preparation step, the light receiving unit is attached to the work holder in a state in which the laser irradiation surface is orthogonal to the reference axis and an origin of the orthogonal coordinate is disposed on a center axis of the work holder by engaging a light receiving unit side engagement portion provided in the light receiving unit with the work holder side engagement portion.

6. The centering method of the rotary caulking device according to claim 1,
   wherein the light receiving unit includes a sensor which includes the laser irradiation surface and the sensor is able to acquire the laser beam irradiation position with respect to the laser irradiation surface as coordinate data in an orthogonal coordinate set on the laser irradiation surface, and
   wherein in the rotation body centering step, an operation of checking the trajectory of the irradiation position is repeated until the trajectory of the irradiation position changes to a desired shape while appropriately adjusting a direction of an orthogonal coordinate set on the laser irradiation surface by rotating the sensor within a virtual plane including the laser irradiation surface and adjusting a rotation body support position with respect to the frame within a virtual plane orthogonal to the reference axis.

7. The centering method of the rotary caulking device according to claim 1, further comprising:
   a movement accuracy improvement step of relatively moving the frame and the work holder by a predetermined amount in the direction of the reference axis after the rotation body centering step ends and performing an adjustment operation for allowing a deviation amount between the center position of the trajectory before the relative movement and the center position of the trajectory after the relative movement to be inside an allowable range when the deviation amount is outside the allowable range.

8. The centering method of the rotary caulking device according to claim 1, further comprising:
   a rotation accuracy improvement step of checking a change amount of the laser beam irradiation position with respect to the laser irradiation surface caused when rotating a coupling body of the rotating shaft, the convex spherical seat, and the laser head while allowing the laser irradiation surface to be irradiated with a laser beam emitted from the laser head in a state in which the rotation body is not rotated but is stopped after the preparation step ends and performing an adjustment operation for allowing the change amount to be inside an allowable range when the change amount is outside the allowable range.

9. A method of manufacturing a rotary caulking device by performing a centering method of the rotary caulking device according to claim 1, the rotary caulking device including a frame which has a reference axis, an annular concave spherical seat which is fixed to the frame and includes a concave spherical portion provided in one side surface in a direction of the reference axis to be coaxial with the reference axis, a convex spherical seat which includes a convex spherical portion spherically engaging with the concave spherical portion, a rotation body which is supported by the frame to be rotatable about a center axis coaxial with the reference axis, a rotating shaft which is inserted through the concave spherical seat while being inclined with respect to the reference axis and is provided so that one side portion in a direction of the reference axis is fixed to the convex spherical seat and the other side portion in the direction of the reference axis is rotatably supported at one circumferential position of the rotation body, a molding die which is attached to the convex spherical seat, and a work holder which is disposed at the side opposite to the rotation body with the molding die interposed therebetween in the direction of the reference axis and is provided to be relatively movable with respect to the frame in the direction of the reference axis and to hold a workpiece.

10. A centering method of a rotary caulking device including a frame, a rotation body which is supported by the frame to be rotatable about a reference axis, a concave spherical seat which includes a concave spherical surface and is fixed to the frame, a convex spherical seat which includes a convex spherical surface slidable on the concave spherical surface and precesses in accordance with the rotation of the rotation body, a molding die which is attached to the convex spherical seat, and a work holder which holds a workpiece, the centering method comprising:
   a preparation step of including a step of attaching a laser head to the convex spherical seat instead of the molding die and a step of attaching a sensor to the work holder instead of the workpiece;
   an irradiation step of allowing a light receiving surface of the sensor to be irradiated with a laser beam from the laser head in a state in which the convex spherical seat precesses; and
   an adjustment step of mechanically adjusting the rotary caulking device on the basis of information on a trajectory of an irradiation position on the light receiving surface of the laser beam from the sensor.

11. A method of manufacturing a hub unit bearing using a rotary caulking device manufactured by the method of manufacturing the rotary caulking device according to claim 10, the hub unit bearing including a shaft member and an inner race which is fitted to the outside of the shaft member and has an axial end surface constrained by a caulking portion formed by plastically deforming a tubular portion provided at an axial end portion of the shaft member outward in a radial direction, wherein the shaft member having the inner race fitted to the outside thereof is held by the work holder so that a center axis of the shaft member is coaxial with the reference axis and the frame and the work holder are relatively moved in a direction of the reference axis while rotating the rotation body to press the molding die against a tubular portion provided at an axial end portion of the shaft member and to plastically deform the tubular portion outward in a radial direction so that the caulking portion is formed.

12. A method of manufacturing a vehicle including a hub unit bearing, wherein the hub unit bearing is manufactured by the method of manufacturing the hub unit bearing according to claim 11.

13. A centering device of a rotary caulking device, wherein the rotary caulking device includes a frame, a rotation body which is supported by the frame to be rotatable about a reference axis, a concave spherical seat which includes a concave spherical surface and is fixed to the frame, a convex spherical seat which includes a convex spherical surface slidable on the concave spherical surface and precesses in accordance with the rotation of the rotation body, a molding die which is attached to the convex spherical seat, and a work holder which holds a workpiece, and wherein the centering device includes a laser head which is attached to the convex spherical seat instead of the molding die, a sensor which includes a light receiving surface receiving a laser beam from the laser head and is held by the work holder instead of the workpiece, and a display which displays a trajectory of a laser beam irradiation position on the light receiving surface on the basis of an output signal from the sensor.

14. A rotary caulking system comprising:

a rotary caulking device; and a centering device, wherein the rotary caulking device includes a frame, a rotation body which is supported by the frame to be rotatable about a reference axis, a concave spherical seat which includes a concave spherical surface and is fixed to the frame, a convex spherical seat which includes a convex spherical surface slidable on the concave spherical surface and precesses in accordance with the rotation of the rotation body, a molding die which is attached to the convex spherical seat, and a work holder which holds a workpiece, and wherein the centering device includes a laser head which is attached to the convex spherical seat instead of the molding die, a sensor which includes a light receiving surface receiving a laser beam from the laser head and is held by the work holder instead of the workpiece, and a display which displays a trajectory of a laser beam irradiation position on the light receiving surface on the basis of an output signal from the sensor.

* * * * *